(12) United States Patent  
Hsiu et al.

(10) Patent No.: US 9,277,610 B2
(45) Date of Patent: Mar. 1, 2016

(54) POWER CONVERTER CIRCUIT FOR LOW POWER ILLUMINATION DEVICE, CONTROL CIRCUIT THEREOF AND METHOD THEREOF

(71) Applicant: Richtek Technology Corporation, Chupei, Hsinchu (TW)

(72) Inventors: Leng-Nien Hsiu, Hsinchu County (TW); Pei-Yuan Chen, Taoyuan County (TW)

(73) Assignee: RICHTEK TECHNOLOGY CORPORATION, Chupei (TW)

( * ) Notice: Subject to any disclaimer, the term of this patent is extended or adjusted under 35 U.S.C. 154(b) by 329 days.

(21) Appl. No.: 14/133,229

(22) Filed: Dec. 18, 2013

(65) Prior Publication Data

US 2014/0167648 A1 Jun. 19, 2014

(30) Foreign Application Priority Data

Dec. 18, 2012 (CN) .......................... 2012 1 0553550

(51) Int. Cl.
*H05B 37/02* (2006.01)
*H05B 33/08* (2006.01)
*H02M 3/158* (2006.01)
*H02M 1/00* (2007.01)

(52) U.S. Cl.
CPC .......... *H05B 33/0815* (2013.01); *H02M 3/1582* (2013.01); *H05B 33/0848* (2013.01); *H02M 2001/007* (2013.01)

(58) Field of Classification Search
CPC ........... H05B 33/0815; H05B 33/0803; H05B 33/0848
See application file for complete search history.

(56) References Cited

U.S. PATENT DOCUMENTS

| 8,106,601 B2 | 1/2012 | Liu et al. |
| 8,513,894 B2 * | 8/2013 | Huang ............... H05B 33/0848 315/224 |
| 2011/0043112 A1 | 2/2011 | Brown et al. |
| 2011/0068703 A1 | 3/2011 | McKinney |
| 2011/0068704 A1 | 3/2011 | McKinney |
| 2012/0169246 A1 | 7/2012 | Eddeane et al. |

* cited by examiner

*Primary Examiner* — Hai L Nguyen
(74) *Attorney, Agent, or Firm* — Birch, Stewart, Kolasch & Birch, LLP

(57) ABSTRACT

A power converter circuit of a low power illumination device includes a boost converter circuit, a buck converter circuit, and a control circuit, for cooperating with a dimmer and an electric transformer. The control circuit configures the boost converter circuit to alternatively operate in a current conducting mode and an off mode, to draw current from the electric transformer in the current conducting mode, and to stop drawing current from the electric transformer in the off mode. The control circuit further configures the buck converter circuit to generate the required output signals to the low power illumination device according to the configuration of the dimmer so that the low power illumination device may perform the required dimming function.

20 Claims, 10 Drawing Sheets

POWER CONVERTER CIRCUIT FOR LOW POWER ILLUMINATION DEVICE, CONTROL CIRCUIT THEREOF AND METHOD THEREOF

CROSS-REFERENCE TO RELATED APPLICATIONS

This application claims the benefit of priority to Patent Application No. 201210553550.7, filed in China on Dec. 18, 2012; the entirety of which is incorporated herein by reference for all purposes.

BACKGROUND

The disclosure generally relates to a power converter circuit of an illumination system and, more particularly, to the power converter circuit with better compatibility.

Due to the depletion of natural resources, people are paying more and more attention to energy conservation and environmental protection issues. Accordingly, illumination devices with less energy efficiency (e.g., incandescent lamps, or halogen lamps) are gradually replaced by illumination devices with higher energy efficiency. The light-emitting diode (LED) has advantages of high luminous efficiency, long life time, compact size, fast start time, high reliability, good durability, etc. Therefore, low power illumination devices such as the LEDs have become more and more popular and been adopted in home, office, street signs, street lights and other indoor and outdoor places for replacing traditional illumination devices.

Many low power illumination devices are manufactured in the form of standard bulbs or tubes to directly replace traditional bulbs or tubes. For example, LEDs may be made into T8 tubes, E27 bulbs, and MR16 lamps. It is, however, difficult to replace many circuit components of the illumination system already installed in the building (e.g., dimmers, electric transformers, and ballasts). If the traditional bulbs or tubes are directly replaced by the low power illumination devices, the low power illumination devices usually have problem when cooperating with traditional circuit components installed in the building. Therefore, the low power illumination device may not be lighted up or may flicker.

The electric transformer is so compact that it is usually utilized in the illumination system. The electric transformer comprises oscillating circuits and other circuit components for providing the required voltage signal with a higher oscillating frequency. The load of the electric transformer must draw enough current to enable the normal operation of the electric transformer. The energy consumption of the low power illumination devices, however, are usually far less than the energy consumption of the traditional lamps, and the low power illumination device may not draw enough current from the electric transformer. Consequently, the low power illumination device usually may not function normally when cooperating with traditional circuit components in the illumination system.

Besides, the phase-cut dimmer is usually adopted in many traditional illumination devices to adjust the brightness of the illumination device. The phase-cut dimmer usually adopts a diode or a triode for alternating current (TRIAC) to cut off a portion of an alternating current (AC) signal so as to adjust the brightness of the illumination device. When the AC signal is cut off, the voltage or the current of the AC signal is configured to be zero or a small value. The brightness of the low power illumination devices (e.g., LEDs), however, may not be adjusted properly when cooperating with the dimmer and the electric transformer. Thus, the low power illumination devices may flicker or may not be lighted up when cooperating with the dimmer and the electric transformer.

U.S. Patent Application No. 2012/0169246A1 discloses an illumination device and a driving method to solve the aforementioned compatibility problem by alternately operating the power converter circuit between a current generating mode and an off mode. Even if the technique of the aforementioned application is adopted, the compatibility problem still occurs when the low power illumination device cooperates with the dimmer and the electric transformer. Thus, the brightness of the low power illumination device still may not be adjusted properly.

SUMMARY

An example embodiment of a power converter circuit of an illumination system for coupling with an electric transformer through a rectifier circuit is disclosed; wherein the electric transformer generates a conversion voltage signal according to a phase-cut signal provided by a dimmer, the rectifier circuit generates a rectified voltage signal according to the conversion voltage signal, and the power converter circuit supplies power to a low power illumination device according to the rectified voltage signal; comprising: a boost converter circuit, coupled with the rectifier circuit, configured to operably generate a boost voltage signal according to the rectified voltage signal; a buck converter circuit, coupled with the boost converter circuit, configured to operably generate a buck voltage signal for supplying power to the low power illumination device according to the boost voltage signal; and a control circuit, coupled with the boost converter circuit and the buck converter circuit, configured to operably configure the boost converter circuit to operate in a current conducting mode to draw current from the electric transformer when the rectified voltage signal is greater than a predetermined voltage signal, and to operably configure the boost converter circuit to operate in an off mode to stop drawing current from the electric transformer when the rectified voltage signal is less than the predetermined voltage signal; wherein a signal value of the boost voltage signal is greater than a signal value of the rectified voltage signal; a signal value of the buck output signal is less than the signal value of the boost voltage signal; the control circuit generates a computation value according to the rectified voltage signal, when the computation value equals to a first value, the control circuit configures the buck converter circuit to configure the buck voltage signal to be a first voltage value, and when the computation value equals to a second value, the control circuit configures the buck converter circuit to configure the buck voltage signal to be a second voltage value.

Another example embodiment of a control circuit of a power converter circuit of an illumination system is disclosed; wherein the illumination system comprises a dimmer, an electric transformer, a rectifier circuit, a boost converter circuit, and a buck converter circuit; the dimmer generates a phase-cut signal according to an input voltage signal; the electric transformer is coupled with the dimmer for generating a conversion voltage signal according to the phase-cut signal; the rectifier circuit is coupled with the electric transformer for generating a rectified voltage signal according to the conversion voltage signal; the boost converter circuit is coupled with the rectifier circuit for generating a boost voltage signal according to the rectified voltage signal; the buck converter circuit is coupled with the boost converter circuit for generating a buck voltage signal according to the boost voltage signal so as to supply power to a low power illumination device; and the control circuit is configured to operably coupled with the boost converter circuit and the buck converter circuit; comprising: a boost control circuit, configured to operably configure a conducting status of a first switch of the boost control circuit; a buck control circuit, configured to operably configure a conducting status of a second switch of the buck control circuit; and a dimmer control circuit, coupled with the boost control circuit and the buck control circuit, configured to operably configure the boost control circuit to intermittently conduct the first switch so that the boost converter circuit operates in a current conducting mode to draw current from the electric transformer when the rectified voltage signal is greater than a predetermined voltage signal, and to operably configure the boost control circuit to turn off the first switch so that the boost converter circuit operates in an off mode to stop drawing current from the electric transformer when the rectified voltage signal is less than the predetermined voltage signal; wherein a signal value of the boost voltage signal is greater than a signal value of the rectified voltage signal; a signal value of the buck output signal is less than the signal value of the boost voltage signal; the dimmer control circuit generates a computation value according to the rectified voltage signal; when the computation value equals to a first value, the dimmer control circuit configures the buck control circuit to configure the conducting status of the second switch so that the buck converter circuit configures the buck voltage signal to be a first voltage value; and when the computation value equals to a second value, the dimmer control circuit configures the buck control circuit to configure the conducting status of the second switch so that the buck converter circuit configures the buck voltage signal to be a second voltage value.

Another example embodiment of a control method of a power converter circuit of an illumination system is disclosed; wherein the illumination system comprises a dimmer, an electric transformer, a rectifier circuit, a boost converter circuit, and a buck converter circuit; the dimmer generates a phase-cut signal according to an input voltage signal; the electric transformer is coupled with the dimmer for generating a conversion voltage signal according to the phase-cut signal; the rectifier circuit is coupled with the electric transformer for generating a rectified voltage signal according to the conversion voltage signal; the boost converter circuit is coupled with the rectifier circuit for generating a boost voltage signal according to the rectified voltage signal; and the buck converter circuit is coupled with the boost converter circuit for generating a buck voltage signal according to the boost voltage signal so as to supply power to a low power illumination device; comprising: configuring a first switch of the boost converter circuit to be turned off when the rectified voltage signal is less than a predetermined voltage signal so that the boost converter circuit operates in an off mode to stop drawing current from the electric transformer; configuring the first switch of the boost control circuit to be intermittently conducted when the rectified voltage signal is greater than the predetermined voltage signal so that the boost converter circuit operates in a current conducting mode to draw current from the electric transformer; generating a computation value according to the rectified voltage signal; when the computation value equals to a first value, configuring a conducting status of a second switch of the buck control circuit so that the buck converter circuit configures the buck voltage signal to be a first voltage value; and when the computation value equals to a second value, configuring the conducting status of the second switch of the buck control circuit so that the buck converter circuit configures the buck voltage signal to be a second voltage value; wherein a signal value of the boost voltage signal is greater than a signal value of the rectified voltage signal, and a signal value of the buck output signal is less than the signal value of the boost voltage signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
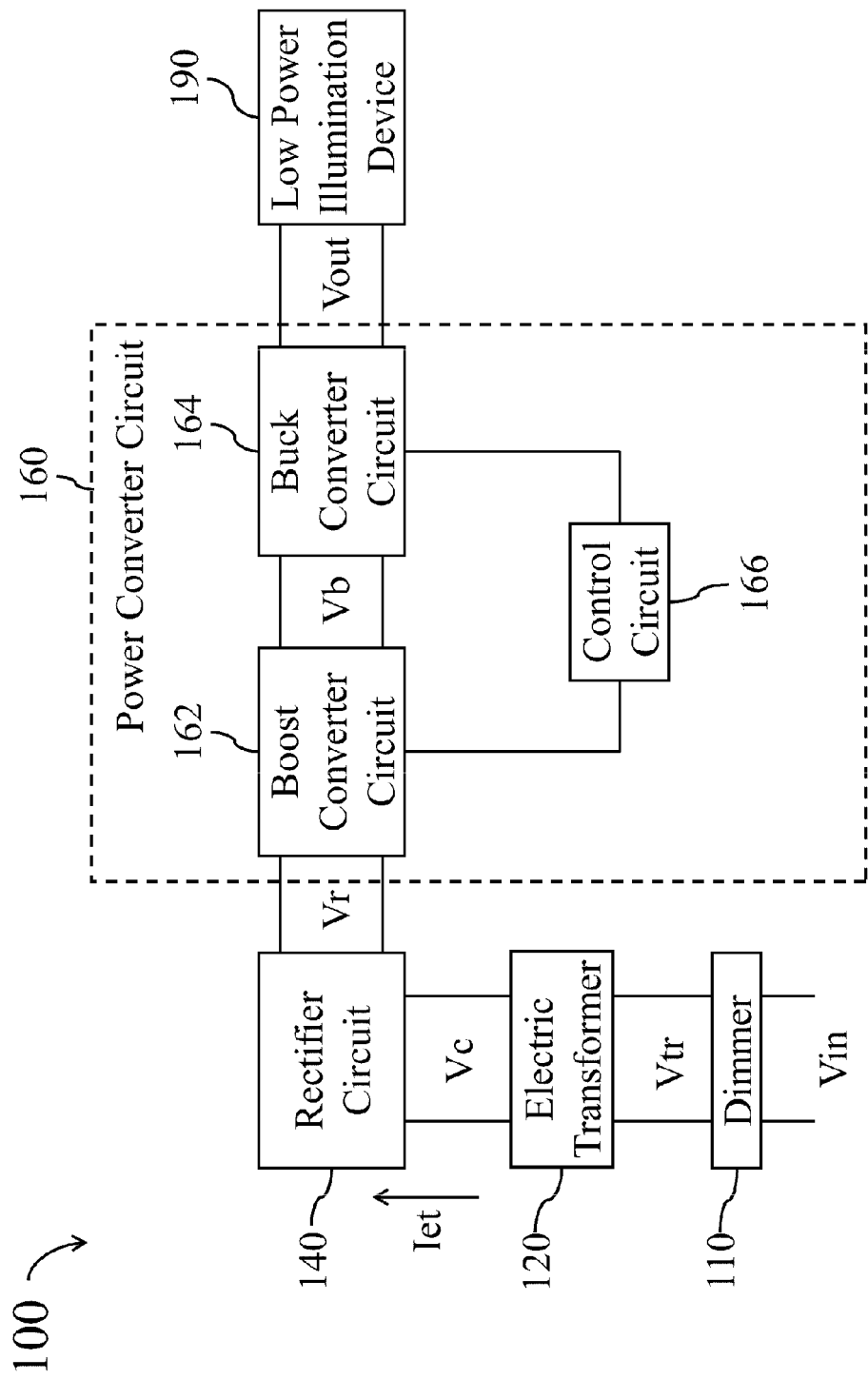
FIG. 1 shows a simplified functional block diagram of an illumination system according to one embodiment of the present disclosure.
Figure 2:
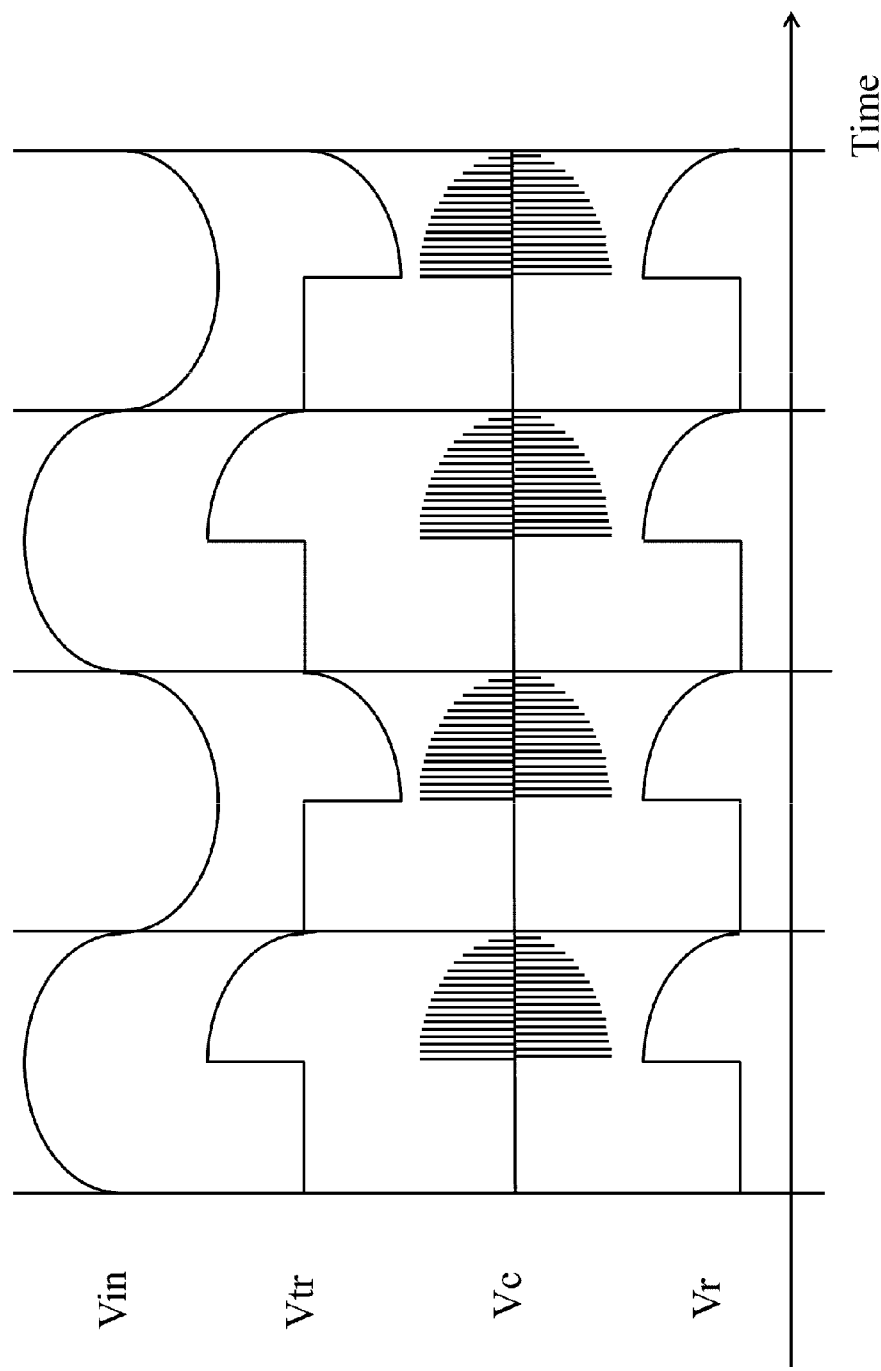
FIG. 2 shows a simplified timing diagram of several signals generated by the illumination system in FIG. 1 according to one embodiment of the present disclosure.

FIG. 1 shows a simplified functional block diagram of an illumination system 100 according to one embodiment of the present disclosure. FIG. 2 shows a simplified timing diagram of several signals generated by the illumination system 100 in FIG. 1 according to one embodiment of the present disclosure. The illumination system 100 comprises a phase-cut dimmer 110, an electric transformer 120, a rectifier circuit 140, a power converter circuit 160 and a low power illumination device 190. For the purposes of conciseness and clear explanation, other components and connections in the illumination system 100 are not shown in FIG. 1.

The phase-cut dimmer 110 is configured to operably receive an input voltage signal Vin, and may generate a phase-cut signal Vtr of the required phase-cut portion according to users' configuration. For example, the user may adjust the degree of the phase-cut portion of the input voltage signal Vin by turning a knob (not shown in FIG. 1), moving a slider (not shown in FIG. 1), etc. The phase-cut dimmer 110 may be realized with a diode or a triode for alternating current (TRIAC) cooperating with one or more active or passive circuit components. FIG. 2 shows an embodiment of the phase-cut signal Vtr generated by the phase-cut dimmer 110 according to the input voltage signal Vin.

In this embodiment, the electric transformer 120 comprises an oscillating circuit (not shown in FIG. 1) for generating a conversion voltage signal Vc according to the phase-cut signal Vtr. For example, in one embodiment that the input voltage signal Vin is a 110 volt (V), 60 Hertz (Hz) alternating current (AC) signal, the electric transformer 120 may transform the input voltage signal Vin into the conversion voltage signal Vc with higher frequency (e.g., the conversion voltage signal Vc may be a 12V, 40,000 Hz AC signal). As shown in the embodiment in FIG. 2, the electric transformer 120 generates the conversion voltage signal Vc with higher frequency according to the phase-cut signal Vtr.

The rectifier circuit 140 is coupled between the electric transformer 120 and the power converter circuit 160. The rectifier circuit 140 is configured to operably rectify the conversion voltage signal Vc to generate a rectified voltage signal Vr for providing the rectified voltage signal Vr to the power converter circuit 160. For example, the rectifier circuit 140 may be realized with a full bridge rectifier circuit, a half bridge rectifier circuit, etc. As shown in the embodiment in FIG. 2, the rectifier circuit 140 generates the rectified voltage signal Vr according to the conversion voltage signal Vc.

In this embodiment, the power converter circuit 160 comprises a boost converter circuit 162, a buck converter circuit 164, and a control circuit 166.

The boost converter circuit 162 generates a boost voltage signal Vb according to the rectified voltage signal Vr, and a signal value of the boost voltage signal Vb is greater than a signal value of the rectified voltage signal Vr. The boost converter circuit 162 may be realized with any suitable circuit structure so as to configure the signal value of the boost voltage signal Vb to be greater than the signal value of the rectified voltage signal Vr.

The buck converter circuit 164 generates a buck voltage signal Vout according to the boost voltage signal Vb, and a signal value of the buck voltage signal Vout is less than the signal value of the boost voltage signal Vb. The buck converter circuit 164 may be realized with any suitable circuit structure so as to configure the signal value of the buck voltage signal Vout to be less than the signal value of the boost voltage signal Vb.

The control circuit 166 is coupled with the boost converter circuit 162 and the buck converter circuit 164. The control circuit 166 is configured to operably configure the operations of the boost converter circuit 162 and the buck converter circuit 164 so that the illumination system 100 may provide the required illuminating function.

Compared with traditional illumination devices (e.g., incandescent lamps or halogen lamps) consuming tens of watts (W), the low power illumination device 190 usually requires 10 W or less for the same degree of brightness. For example, the low power illumination device 190 may be realized with one or more light-emitting diodes, other suitable low power consumption illumination devices, etc.

In many illumination systems, the electric transformer 120 usually requires a minimum load current Imin and/or a minimum load frequency to operate normally. Namely, a current Iet drawn from the electric transformer 120 must greater than the minimum load current Imin, and/or the frequency of the current Iet must be greater than the minimum load frequency so that the electric transformer 120 may operate normally for providing the required conversion voltage signal Vc.

The power consumption of the low power illumination device 190, however, is usually far less than the traditional illumination device. The low power illumination device 190 cannot draw enough current Iet from the electric transformer 120 in the traditional way. Consequently, the electric transformer 120 cannot operate normally and the low power illumination device 190 may flicker or may not be lighted up.

Besides, when the user adjusts brightness by using the phase-cut dimmer 110, the voltage or the current of the phase-cut signal Vtr is zero or a small value when the phase-cut signal Vtr is cut off. In this situation, the electric transformer 120 and the low power illumination device 190 may not operate normally and the low power illumination device 190 may flicker or may not be lighted up.

The control circuit 166 may configure the boost converter circuit 162 to draw current from the electric transformer 120 in an appropriate way so that the electric transformer 120 may operate normally. The control circuit 166 may also configure the buck converter circuit 164 to steadily provide the buck voltage signal Vout to the low power illumination device 190. Therefore, the compatibility problem of the low power illumination device 190 may be solved, and the low power illumination device 190 may provide the required illuminating and dimming function.

Figure 3:
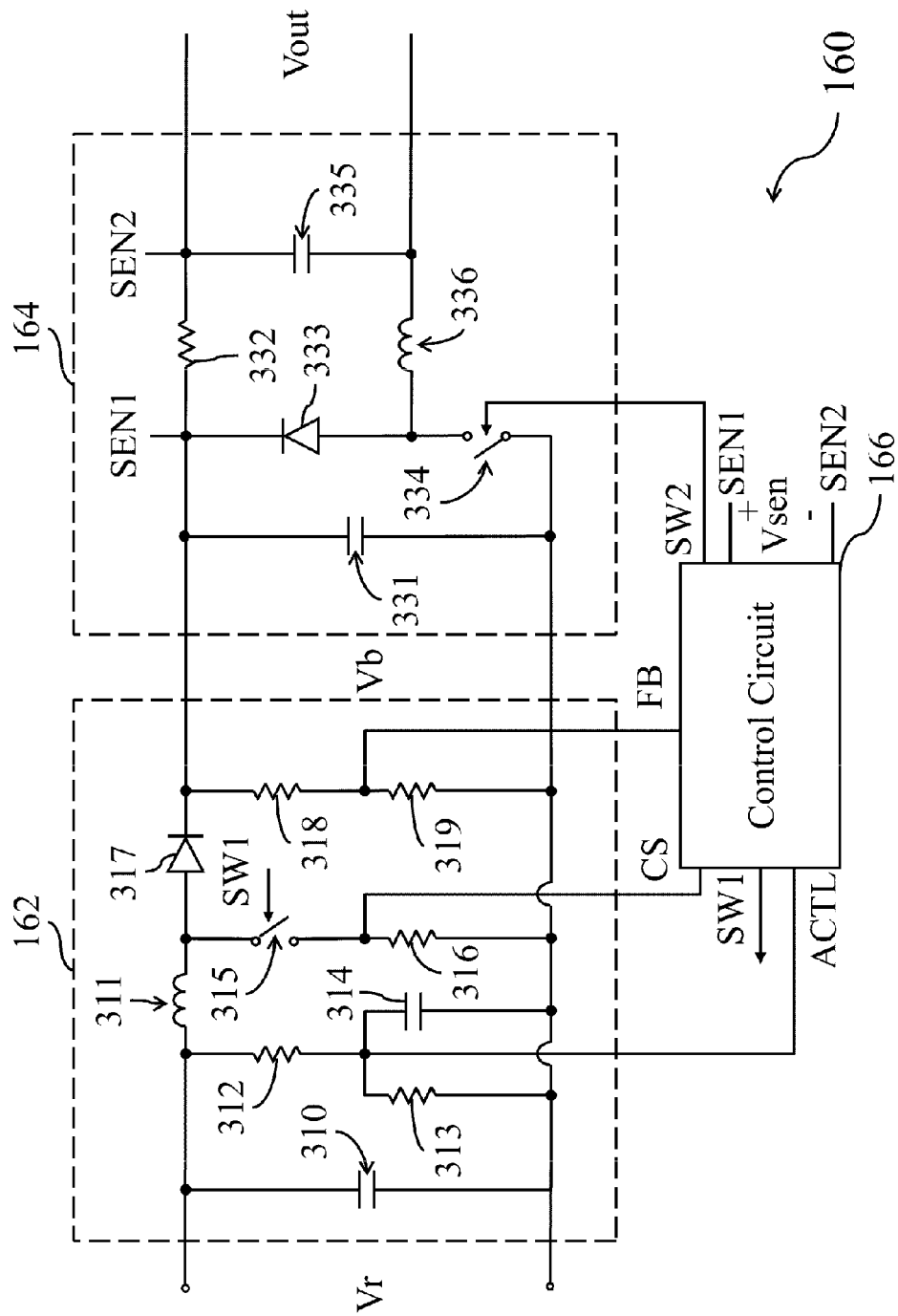
FIG. 3 shows a simplified circuit diagram of the power converter circuit in FIG. 1 according to one embodiment of the present disclosure.

FIG. 3 shows a simplified circuit diagram of the power converter circuit 160 in FIG. 1 according to one embodiment of the present disclosure. The operations of the illumination system 100 will be further explained below by reference to FIGS. 1-3.

In the embodiment in FIG. 3, the boost converter circuit 162 comprises a first capacitor 310, a first inductor 311, a first resistor 312, a second resistor 313, a second capacitor 314, a first switch 315, a third resistor 316, a first diode 317, a fourth resistor 318 and a fifth resistor 319. The first switch 315 may be realized with a transistor, etc.

The first capacitor 310 is coupled with an output terminal of the rectifier circuit 140 to receive the rectified voltage signal Vr. A first terminal of the first capacitor 310 is coupled with a first terminal of the first inductor 311 and a first terminal of the first resistor 312. A second terminal of the first inductor 311 is coupled with a first terminal of the first switch 315 and a first terminal of the first diode 317. A second terminal of the first resistor 312 is coupled with a first terminal of the second resistor 313 and a first terminal of the second capacitor 314. A second terminal of the first switch 315 is coupled with a first terminal of the third resistor 316. A second terminal of the first diode 317 is coupled with a first terminal of the fourth resistor 318. A second terminal of the fourth resistor 318 is coupled with a first terminal of the fifth resistor 319. A second terminal of the second resistor 313, a second terminal of the second capacitor 314, a second terminal of the third resistor 316, and a second terminal of the fifth resistor 319 are respectively coupled with a second terminal of the first capacitor 310.

The control circuit 166 may configure a conducting status of the first switch 315 by using a first control signal SW1 so that the boost converter circuit 162 generates the required boost voltage signal Vb according to the rectified voltage signal Vr. For example, the control circuit 166 may generate the first control signal SW1 in the form of a pulse width modulation signal according to a first sensing signal CS of the boost converter circuit 162 so as to intermittently conduct the first switch 315. Consequently, a signal value between the first terminal of the fourth resistor 318 and the second terminal of the fifth resistor 319 (i.e., the signal value of the boost voltage signal Vb) is greater than the signal value of the rectified voltage signal Vr. The signal between the first terminal of the fourth resistor 318 and the second terminal of the fifth resistor 319 is outputted as the boost voltage signal Vb.

The rectified voltage signal Vr is divided by the first resistor 312 and the second resistor 313 to generate a dimmer signal ACTL. The control circuit 166 adjusts the operations of the boost converter circuit 162 and/or the operations of the buck converter circuit 164 according to the dimmer signal ACTL so that the low power illumination device 190 may perform the required dimming function.

The boost voltage signal Vb is divided by the fourth resistor 318 and the fifth resistor 319 to generate a feedback signal FB. The control circuit 166 may also configure the conducting time, the conducting frequency and the conducting status of the first switch 315 according to the feedback signal FB so that the boost converter circuit 162 may provide the required boost voltage signal Vb.

In the embodiment in FIG. 3, the buck converter circuit 164 comprises a third capacitor 331, a sixth resistor 332, a second diode 333, a second switch 334, a fourth capacitor 335 and a second inductor 336. The second switch 334 may be realized with a transistor, etc.

A first terminal of the third capacitor 331 is coupled with a first terminal of the sixth resistor 332 and a first terminal of the second diode 333. A second terminal of the second diode 333 is coupled with a first terminal of the second switch 334. A second terminal of the second switch 334 is coupled with a second terminal of the third capacitor 331. A second terminal of the sixth resistor 332 is coupled with a first terminal of the fourth capacitor 335. The second inductor 336 is coupled between a second terminal of the second diode 333 and a second terminal of the fourth capacitor 335.

The control circuit 166 may configure a conducting status of the second switch 334 by using a second control signal SW2 so that the buck converter circuit 164 may generate the required buck voltage signal Vout according to the boost voltage signal Vb. For example, in this embodiment, the control circuit 166 may generate the second control signal SW2 in the form of a pulse width modulation signal according to the second sensing signal Vsen between two terminals SEN1 and SEN2 of the sixth resistor 332 so as to intermittently conduct the second switch 334. Consequently, a signal value between the first terminal and the second terminal of the fourth capacitor 335 (i.e., the signal value of the buck voltage signal Vout) is less that the signal value of the boost voltage signal Vb. The signal value between the first terminal and the second terminal of the fourth capacitor 335 is outputted as the buck voltage signal Vout so as to supply power to the low power illumination device 190.

In one preferred embodiment, the signal value of the buck voltage signal Vout is greater than a minimum load voltage Vmin of the low power illumination device 190 so as to prevent the low power illumination device 190 from flickering. The minimum load voltage Vmin is the minimum voltage to prevent the low power illumination device 190 from flicking. For example, when the low power illumination device 190 comprises three light-emitting diodes each with a 3V conducting voltage, the minimum load voltage Vmin of the low power illumination device 190 is 9V. Therefore, the control circuit 166 configures the buck voltage signal Vout provided by the buck converter circuit 164 to be greater than 9V.

Figure 4:
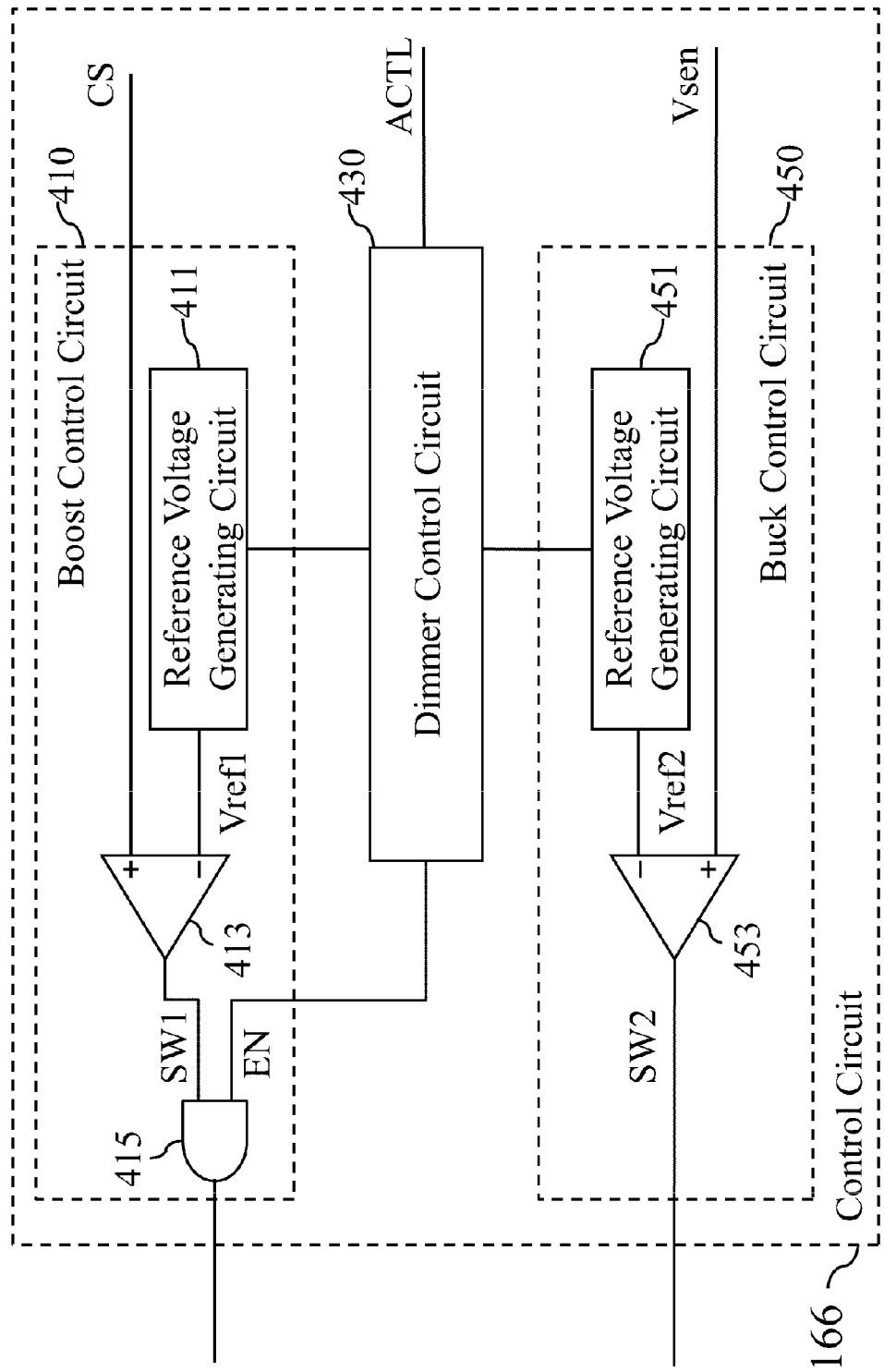
FIG. 4 shows a simplified circuit diagram of the control circuit of the power converter circuit in FIG. 1 according to one embodiment of the present disclosure.
Figure 5:
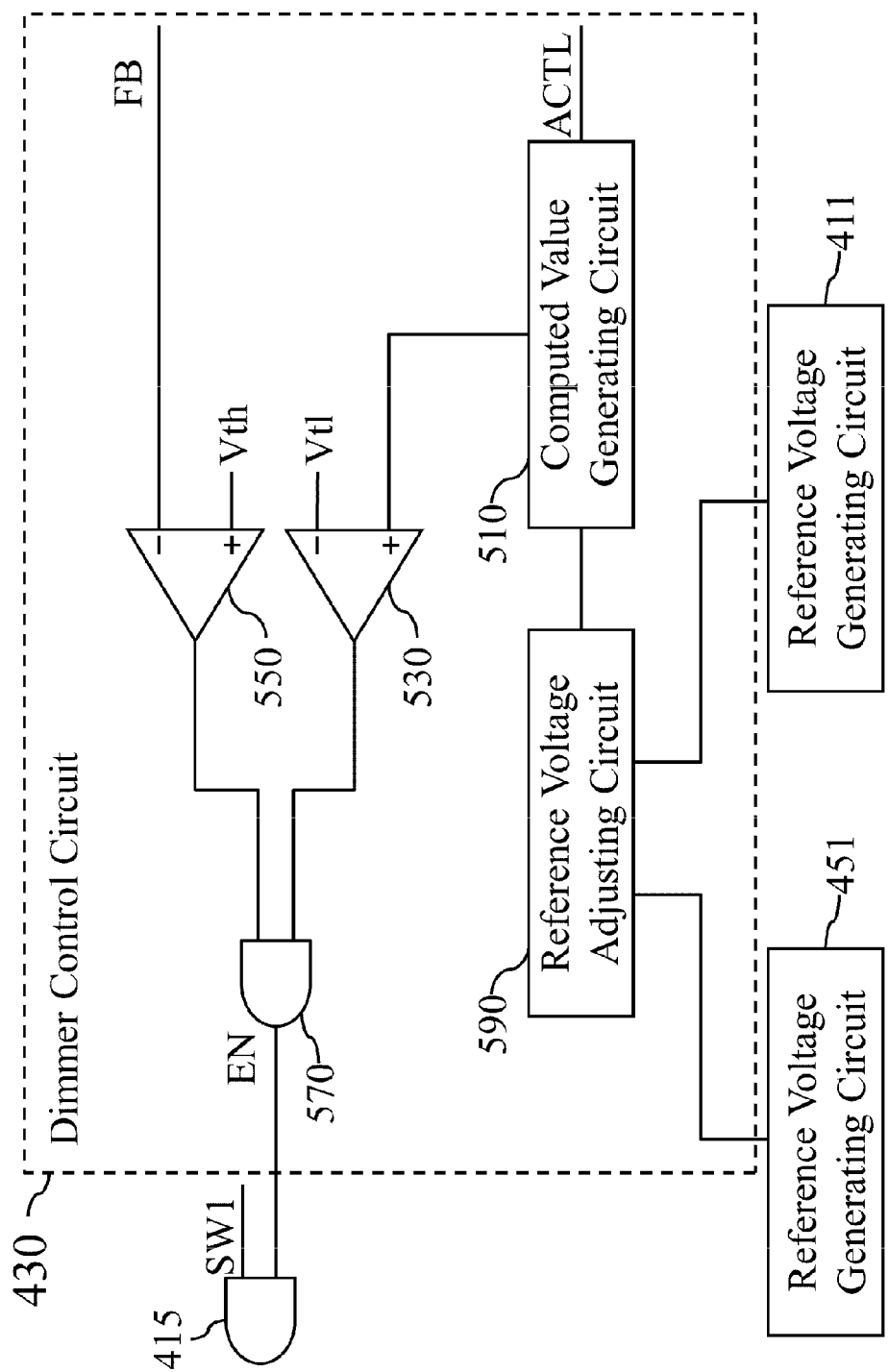
FIG. 5 shows a simplified circuit diagram of the dimmer control circuit in FIG. 4 according to one embodiment of the present disclosure.
Figure 6:
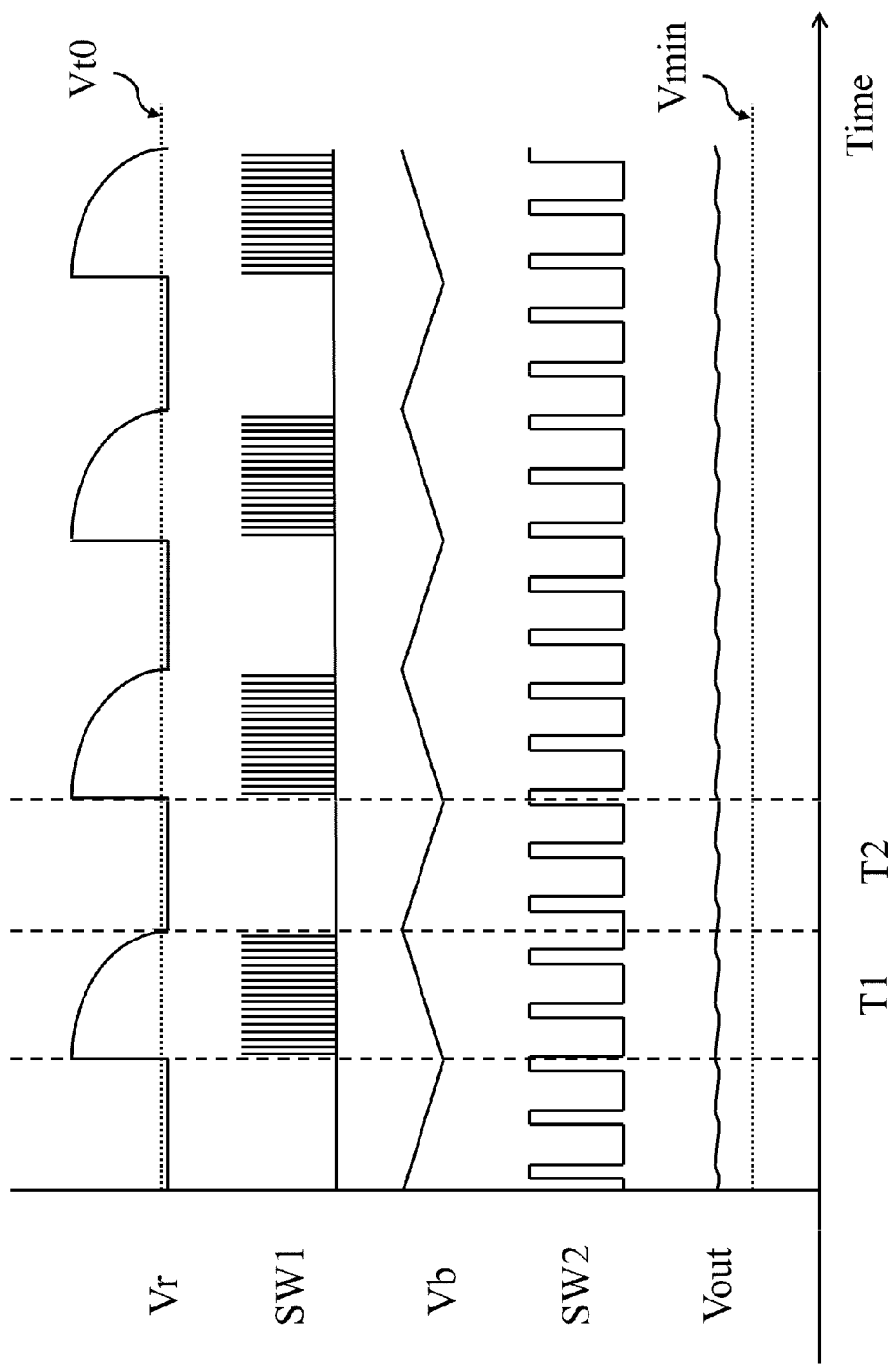
FIG. 6 shows a simplified timing diagram of several signals generated by the illumination system in FIG. 1 according to another embodiment of the present disclosure.

FIG. 4 shows a simplified circuit diagram of the control circuit 166 of the power converter circuit 160 in FIG. 1 according to one embodiment of the present disclosure. FIG. 5 shows a simplified circuit diagram of a dimmer control circuit 430 in FIG. 4 according to one embodiment of the present disclosure. FIG. 6 shows a simplified timing diagram of several signals generated by the illumination system 100 in FIG. 1 according to another embodiment of the present disclosure. The operations of the illumination system 100 will be further described below by reference to FIGS. 1-6.

The embodiment in FIG. 4 shows that the control circuit 166 comprises a boost control circuit 410, a dimmer control circuit 430 and a buck control circuit 450. The control circuit 166 generates the control signals SW1 and SW2 according to the dimmer signal ACTL. Thus, the boost converter circuit 162 and the buck converter circuit 164 operate accordingly and the low power illumination device 190 may perform the required dimming function. In this embodiment, the boost control circuit 410 comprises a first reference voltage generating circuit 411, a first comparator circuit 413 and a first AND gate 415. The buck control circuit 450 comprises a second reference voltage generating circuit 451 and a second comparator circuit 453.

In the boost control circuit 410 in this embodiment, the first reference voltage generating circuit 411 is configured to operably generate a first reference voltage signal Vref1. The first comparator circuit 413 compares the first sensing signal CS of the boost converter circuit 162 with the first reference voltage signal Vref1 to generate the first control signal SW1 so as to configure the conducting status of the first switch 315. For example, the first comparator circuit 413 may generate the first control signal SW1 in the form of a pulse width modulation signal so as to configure the boost converter circuit 162 to output the required boost voltage signal Vb to the buck converter circuit 164.

The first AND gate 415 performs the "AND" operation on the first control signal SW1 and the control signal EN outputted from the dimmer control circuit 430 so as to configure the conducting status of the first switch 315. Accordingly, the boost converter circuit 162 may draw current from the electric transformer 120 in an appropriate way. When a signal value of the control signal EN is low, the first AND gate 415 generates an output signal with a low signal value after performing the "AND" operation on the first control signal SW1 and the control signal EN. Therefore, the first switch 315 is turned off, and thus the boost converter circuit 162 operates in an off mode. When the signal value of the control signal EN is high, the first AND gate 415 may configure the conducting status of the first switch 315 according to the first control signal SW1 after performing the "AND" operation on the first control signal SW1 and the control signal EN. Therefore, the boost converter circuit 162 operates in a current conducting mode.

In the buck control circuit 450 in this embodiment, the second reference voltage generating circuit 451 is configured to operably generate a second reference voltage signal Vref2. The second comparator circuit 453 compares the second sensing signal Vsen of the buck converter circuit 164 with the second reference voltage signal Vref2 to generate the second control signal SW2 so as to configure the conducting status of the second switch 334. For example, the second comparator circuit 453 may generate the second control signal SW2 in the form of a pulse width modulation signal so as to configure the buck converter circuit 164 to output the required voltage and current to the low power illumination device 190.

In this embodiment, the dimmer control circuit 430 receives the dimmer signal ACTL to generate the control signal EN, and to configure at least one of the first reference voltage generating circuit 411 and the second reference voltage generating circuit 451 according to the dimmer signal ACTL so as to adjust the first control signal SW1 and/or the second control signal SW2. Therefore, the boost converter circuit 162 and the buck converter circuit 164 may generate the required boost voltage signal Vb and the required buck voltage signal Vout so that the low power illumination device 190 may perform the required dimming function.

For example, in the embodiment in FIG. 5, the dimmer control circuit 430 comprises a computation value generating circuit 510, a third comparator circuit 530, a fourth comparator circuit 550, a second AND gate 570, and a reference voltage adjusting circuit 590.

In one embodiment, the computation value generating circuit 510 may be realized with a low pass filtering circuit comprising one or more resistors, inductors, capacitors, active components, and/or passive components. The computation value generating circuit 510 filters the dimmer signal ACTL received within a period of time so as to generate a filtered value, an average value, a weighted average value, etc. of the dimmer signal ACTL to be the computation value. In another embodiment, the computation value generating circuit 510 may be realized with an integrator circuit comprising one or more amplifiers, one or more switched capacitor circuits, one or more resistors, inductors, capacitors, active components, and/or passive components so as to generate a cumulative value or a weighted cumulative value of the dimmer signal ACTL received within a period of time to the computation value.

In this embodiment, the third comparator circuit 530 compares the computation value of the dimmer signal ACTL with a first predetermined voltage signal Vt1. The fourth comparator circuit 550 compares the feedback signal FB with a second predetermined voltage signal Vth. The output signals the comparator circuits 530 and 550 are transmitted to the second AND gate 570 to generate the control signal EN.

When the phase-cut signal Vtr generated by the dimmer 110 is cut off, the corresponding rectified voltage signal Vr generated by the rectifier circuit 140 is equal to zero or a small value, and the dimmer signal ACTL generated according to the rectified voltage signal Vr is also equal to zero or a small value. Accordingly, the dimmer signal ACTL is less than the first predetermined voltage signal Vt1, and thus the third comparator circuit 530 generates an output signal with a low signal value so that the second AND gate 570 generates the control signal EN with a low signal value. After the first AND gate 415 receives the control signal EN with a low signal value, the first AND gate 415 generates the output signal with a low signal value. Therefore, the first switch 315 is turned off, and thus the boost converter circuit 162 operates in the off mode.

When the phase-cut signal Vtr generated by the dimmer 110 is not cut off, the dimmer signal ACTL generated according to the rectified voltage signal Vr is greater than the first predetermined voltage signal Vt1. Accordingly, the third comparator circuit 530 generates the output signal with a high signal value. When a signal value of the feedback signal FB is less than the second predetermined voltage signal Vth, the second AND gate 570 generates the control signal EN with a high signal value. After the first AND gate 415 receives the control signal EN with a high signal value, the first AND gate 415 outputs the first control signal SW1 to the first switch 315. Therefore, the first switch 315 is intermittently conducted, and the boost converter circuit 162 operates in the current conducting mode.

In this embodiment, the boost voltage signal Vb increases continuously after the boost converter circuit 162 enters the current conducting mode, and the feedback signal FB generated according to the boost voltage signal Vb increases continuously as well. When the feedback signal FB is greater than the second predetermined voltage signal Vth, the fourth comparator circuit 550 generates the output signal with a low signal value. Thus, the signal value of the control signal EN generated by the second AND gate 570 and the signal value of the first AND gate 415 are low, and the first switch 315 is turned off. Accordingly, the boost voltage signal Vb may be maintained in a predetermined voltage range so as to prevent the circuit components from the damage of the excessively high voltage.

In other embodiments, if the boost voltage signal Vb generated by the boost converter circuit 162 may be maintained in a safe voltage range, the fourth comparator circuit 550, the second AND gate 570 and the related components of the dimmer control circuit 430 may be omitted.

The reference voltage adjusting circuit 590 receives the computation value of the dimmer signal ACTL so as to configure the second reference voltage generating circuit 451 to configure the second reference voltage signal Vref2. Therefore, the buck control circuit 450 may operate accordingly to perform the required dimming function. In this embodiment, the reference voltage adjusting circuit 590 configures the first reference voltage generating circuit 411 to configure the first reference voltage signal Vref1 according to the computation value of the dimmer signal ACTL so as to configure the boost converter circuit 162 to draw enough amount of current. For example, in one embodiment, when a average value of the dimmer signal ACTL is respectively a first value, a second value and a third value (or respectively locates in a first range, a second range and a third range), the brightness of the low power illumination device 190 is respectively adjusted to be 80%, 50% and 20%. Accordingly, the dimmer control circuit 430 configures the reference voltage generating circuits 411 and 451 to respectively configure the reference voltage signals Vref1 and Vref2 so that the boost control circuit 410 and the buck control circuit 450 respectively outputs the required first control signal SW1 and the required second control signal SW2. Therefore, the control circuit 166 configures the boost converter circuit 162 to draw enough current, and configures the buck converter circuit 164 to respectively output a first voltage, a second voltage, and a third voltage (and/or a first current, a second current, and a third current) corresponding to the required brightness to the low power illumination device 190. Accordingly, the low power illumination device 190 may perform the required 80%, 50%, and 20% brightness. In other embodiments, the reference voltage adjusting circuit 590 is configured to not configure the first reference voltage generating circuit 411 to adjust the first reference voltage signal Vref1.

In the embodiments in FIG. 4 and FIG. 5, when the dimmer 110 configures the brightness of the low power illumination device 190 to be higher, the reference voltage adjusting circuit 590 configures the second reference voltage generating circuit 451 to generate the second reference voltage signal Vref2 with a lower signal value. Thus, the conducting time and/or the duty cycle of the second control signal SW2 may be increased to enhance the brightness of the low power illumination device 190.

In the embodiments in FIG. 4 and FIG. 5, when the dimmer 110 configures the brightness of the low power illumination device 190 to be lower, the reference voltage adjusting circuit 590 configures the second reference voltage generating circuit 451 to generate the second reference voltage signal Vref2 with a higher signal value. Thus, the conducting time and/or the duty cycle of the second control signal SW2 may be decreased to reduce the brightness of the low power illumination device 190.

In the embodiments in FIG. 4 and FIG. 5, when the dimmer 110 configures the brightness of the low power illumination device 190 to be higher, the reference voltage adjusting circuit 590 may also configure the first reference voltage generating circuit 411 to generate the first reference voltage signal Vref1 with a lower signal value. Thus, the conducting time and/or the duty cycle of the first control signal SW1 may be increased. Accordingly, the boost converter circuit 162 may draw more current so that the buck converter circuit 164 may provide enough current to the low power illumination device 190 for preventing the low power illumination device 190 from flickering.

In the embodiment in FIG. 4, when the dimmer 110 configures the brightness of the low power illumination device 190 to be lower, the reference voltage adjusting circuit 590 may also configure the first reference voltage generating circuit 411 to generate the first reference voltage signal Vref1 with a higher signal value. Thus, the conducting time and/or the duty cycle of the first control signal SW1 may be decreased. Accordingly, the boost converter circuit 162 may draw less current so that the buck converter circuit 164 may not only provide enough current for the low power illumination device 190 to prevent the low power illumination device 190 from flickering, but also conserve energy and increase the energy efficiency.

FIG. 6 shows a simplified timing diagram of several signals generated by the illumination system 100 according to another embodiment of the present disclosure. The operations of the illumination system 100 will be further described below by reference to FIGS. 1-6. The embodiment in FIG. 6 shows a simplified waveform of the rectified voltage signal Vr within a period of time.

In a period T1 in FIG. 6, when the phase-cut signal Vtr generated by the dimmer 110 is not cut off, the rectified voltage signal Vr generated by the rectifier circuit 140 is greater than a third predetermined voltage signal Vt0. The dimmer control circuit 430 receives the corresponding dimmer signal ACTL. When the computation value of the dimmer signal ACTL is greater than the first predetermined voltage signal Vt1, the dimmer control circuit 430 configures the boost control circuit 410 to configure the conducting status of the first switch 315 according to the first control signal SW1. Therefore, the first switch 315 of the boost converter circuit 162 is intermittently conducted, and the boost converter circuit 162 operates in the current conducting mode.

In a period T2, when the phase-cut signal Vtr generated by the dimmer 110 is cut off, the rectified voltage signal Vr generated by the rectifier circuit 140 is less than the third predetermined voltage signal Vt0. The dimmer control circuit 430 receives the corresponding dimmer signal ACTL. When the computation value of the dimmer signal ACTL is less than the first predetermined voltage signal Vt1, the dimmer control circuit 430 configures the boost control circuit 410 to generate the output signal with a low signal value. Therefore, the first switch 315 of the boost converter circuit 162 is turned off, and the boost converter circuit 162 operates in the off mode.

The dimmer control circuit 430 configures the buck control circuit 450 to intermittently configure the signal value of the second control signal SW2 to be high according to the computation value of the dimmer signal ACTL. Accordingly, the second switch 334 of the buck converter circuit 164 is intermittently conducted, and thus the buck converter circuit 164 may provide the low power illumination device 190 with the required buck voltage signal Vout so that the low power illumination device 190 generates the required brightness. Furthermore, the dimmer control circuit 430 configures the buck voltage signal Vout provided by the buck converter circuit 164 to the low power illumination device 190 to be greater than the minimum load voltage Vmin of the low power illumination device 190 so as to prevent the low power illumination device 190 from flickering.

In this embodiment, the control circuit 166 configures the boost converter circuit 162 to draw enough current from the electric transformer 120 in the period T1 so that the power converter circuit 160 may operate normally in the periods T1 and T2. In the period T2, because the phase-cut signal Vtr is cut off and there is no current to be drawn, the control circuit 166 may also further configure the boost converter circuit 162 to stop operating so as to conserve energy. Moreover, according to the configuration of the dimmer 110 (in this embodiment, the configuration is the degree of cut-off portion of the phase-cut signal Vtr and/or the rectified voltage signal Vr), the control circuit 166 may configure the buck converter circuit 164 to supply power to the low power illumination device 190 according to the current drawn by the boost converter circuit 162 in the period T1. Therefore, the low power illumination device 190 may continuously and steadily provide the required illuminating function.

In the embodiment in FIG. 6, the control circuit 166 may configure the boost converter circuit 162 to draw enough current from the electric transformer 120. Therefore, the control circuit 166 may operate normally when cooperating with the preexisting circuit elements (e.g., the dimmer and the electric transformer). Moreover, the control circuit 166 may adjust the operations of the buck converter circuit 164 according to the user's configuration of the dimmer 110 so that the low power illumination device 190 may provide the required brightness.

In the aforementioned embodiments, the dimmer control circuit 430 may configure the buck converter circuit 164 to output the corresponding current value to the low power illumination device 190 according to the computation value of the dimmer signal ACTL. Therefore, the low power illumination device 190 may provide the required dimming function. For example, FIGS. 7~9 show simplified curve diagrams of the current value of the low power illumination device 190 configured by the dimmer control circuit 430 according to the dimmer signal ACTL.

Figure 7:
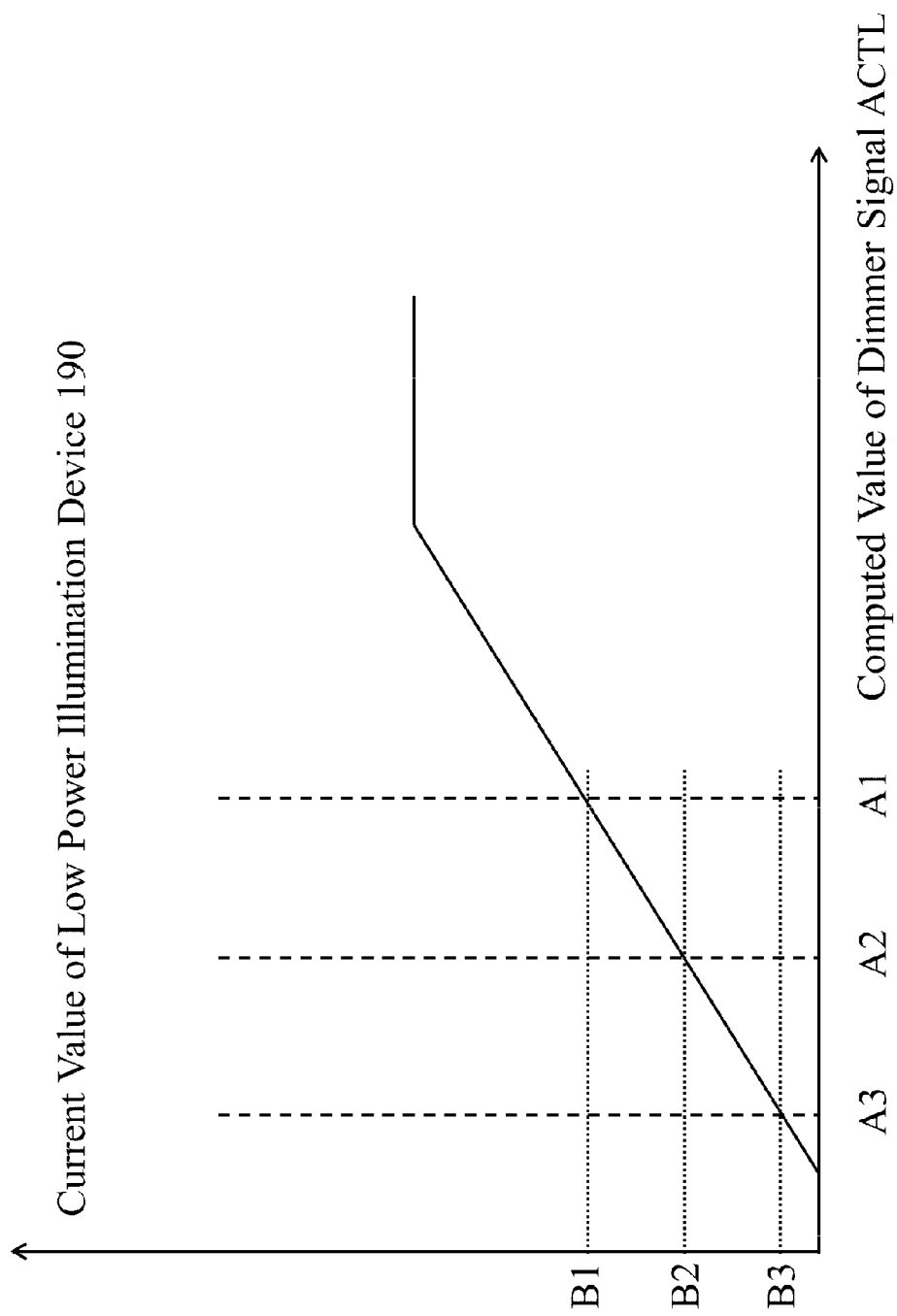
FIGS. 7-9 show simplified curve diagrams of the current value of the low power illumination device configured by the control circuit of the power converter circuit in FIG. 1 according to several embodiments of the present disclosure.

In the embodiment in FIG. 7, the dimmer control circuit 430 adjusts brightness linearly. When the computation value of the dimmer signal ACTL is respectively A1, A2, and A3, the dimmer control circuit 430 configures the buck converter circuit 164 to respectively output the corresponding current values B1, B2, and B3 to the low power illumination device 190. Therefore, the low power illumination device 190 may provide the required dimming function. Accordingly, in a dimmable range, when a difference between the computation values of the dimmer signal ACTL A1 and A2 is equal to a difference between A2 and A3, a difference between the current values B1 and B2 is equal to a difference between B2 and B3.

Figure 8:
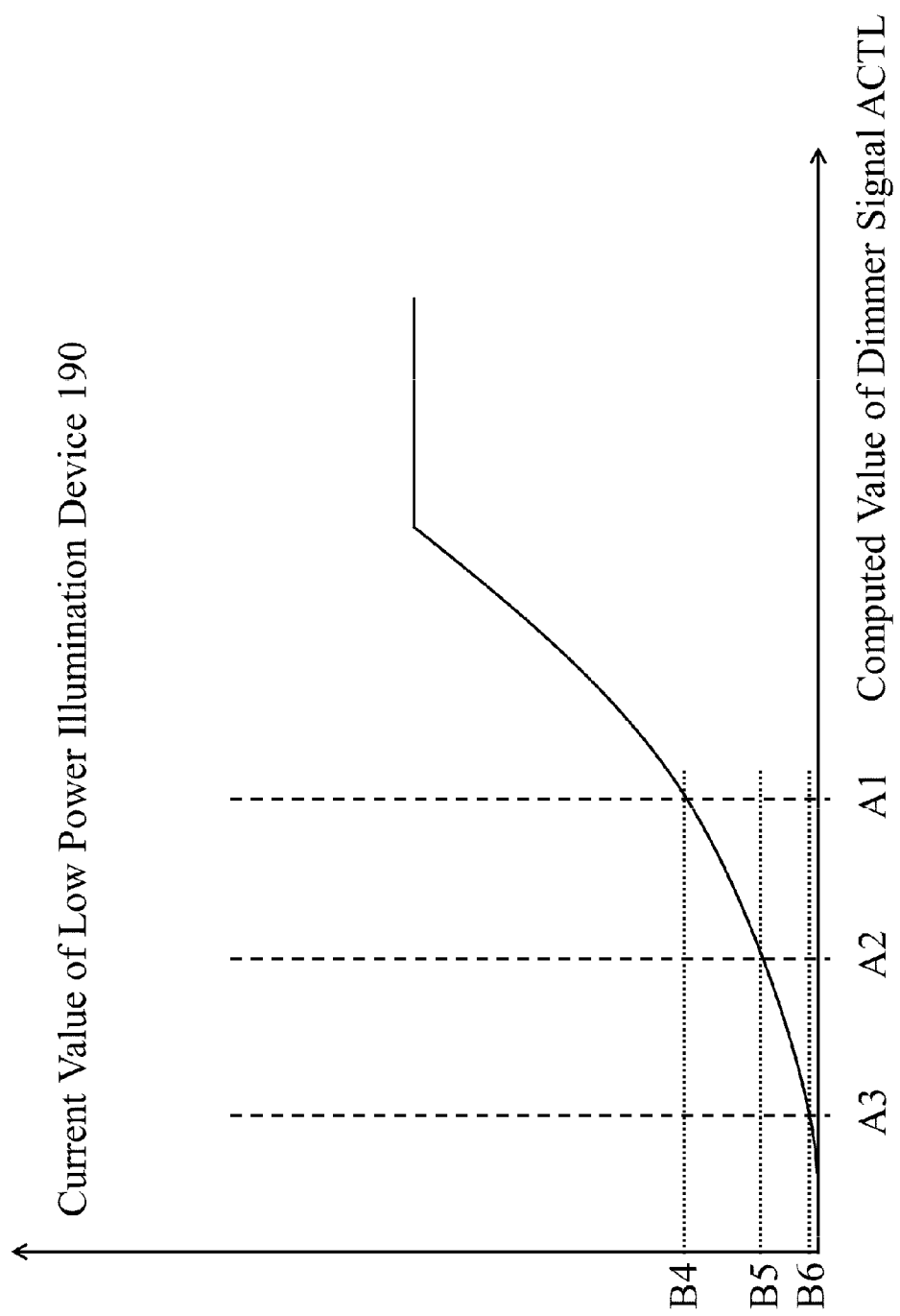
Figure 9:
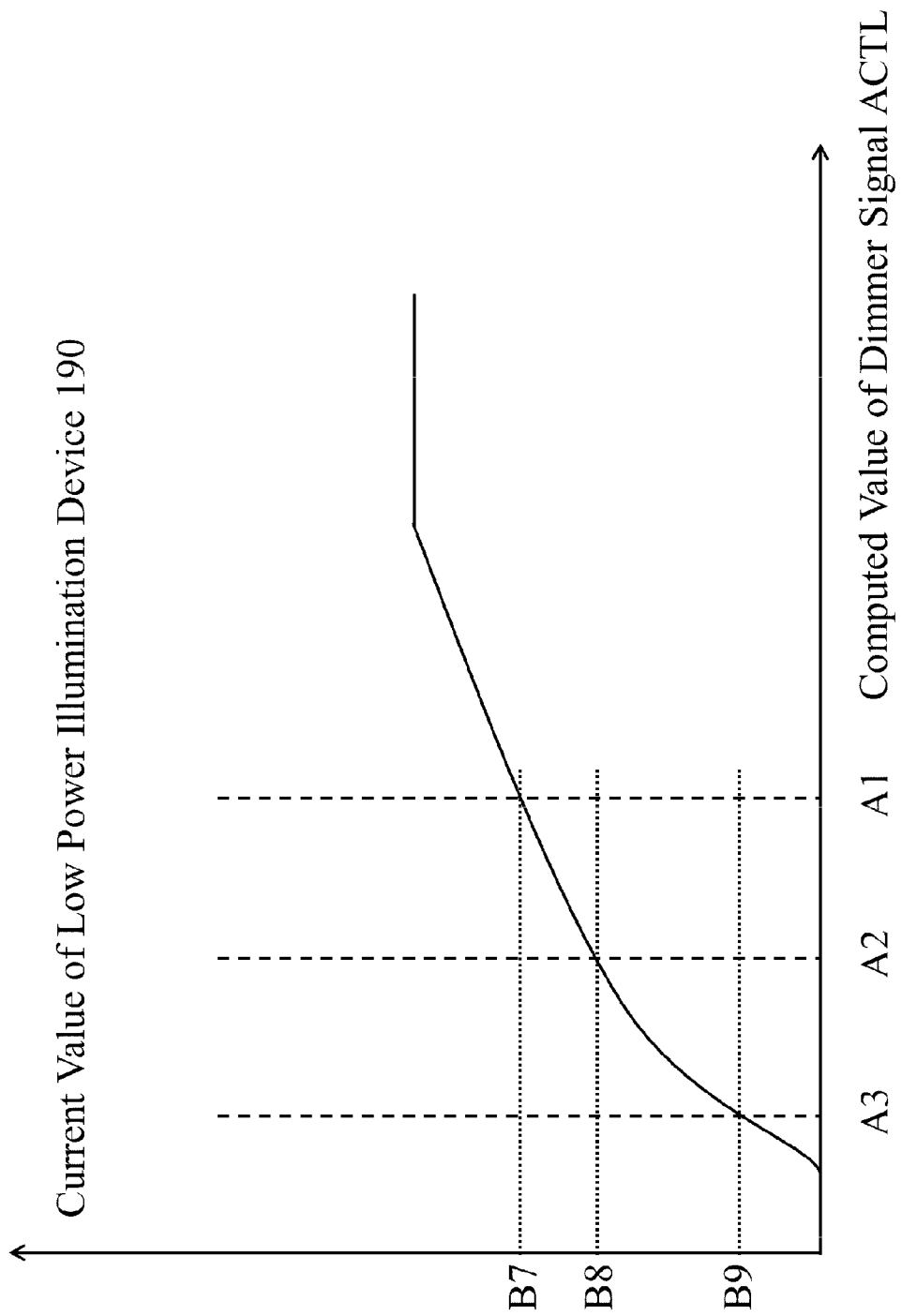

In the embodiment in FIG. 8, the dimmer control circuit 430 adjusts brightness nonlinearly. When the computation value of the dimmer signal ACTL is respectively A1, A2, and A3, the dimmer control circuit 430 configures the buck converter circuit 164 to respectively output the corresponding current values B4, B5, and B6 to the low power illumination device 190. Therefore, the low power illumination device 190 may provide the required dimming function. Accordingly, in a dimmable range, when the difference between the computation values of the dimmer signal ACTL A1 and A2 is equal to the difference between A2 and A3, a difference between the current values B4 and B5 is greater than a difference between B5 and B6.

In the embodiment in FIG. 8, when the computation value of the dimmer signal ACTL is respectively A1, A2, and A3, the current values B4, B5, and B6 of the low power illumination device 190 may be configured to be respectively less than the current values B1, B2, and B3 in FIG. 7. Therefore, the low power illumination device 190 may generate lower brightness to conserve more energy.

In the embodiment in FIG. 9, the dimmer control circuit 430 adjusts brightness nonlinearly. When the computation value of the dimmer signal ACTL is respectively A1, A2, and A3, the dimmer control circuit 430 configures the buck converter circuit 164 to respectively output the corresponding current values B7, B8, and B9 to the low power illumination device 190. Therefore, the low power illumination device 190 may provide the required dimming function. Accordingly, in a dimmable range, when the difference between the computation values of the dimmer signal ACTL A1 and A2 is equal to the difference between A2 and A3, a difference between the current values B7 and B8 is less than a difference between B8 and B9.

In the embodiment in FIG. 9, when the computation value of the dimmer signal ACTL is respectively A1, A2, and A3, the current values B7, B8, and B9 of the low power illumination device 190 may be configured to be respectively greater than the current values B1, B2, and B3 in FIG. 7. Therefore, the low power illumination device 190 may generate higher brightness. Because the buck converter circuit 164 has to supply more power to the low power illumination device 190 in this embodiment, the control circuit 166 configures the boost converter circuit 162 to draw more current from the electric transformer 120. Accordingly, when the current drawn from the electric transformer 120 by the boost converter circuit 162 is enough, the electric transformer 120 may operate normally, and the compatibility of the low power illumination device 190 and the electric transformer may be improved.

In order to further improve the compatibility of the electric transformer 120 and the low power illumination device 190, the control circuit 166 may configure the boost converter circuit 162 to draw the current from the electric transformer 120 in at least two modes in the period T1 in the current conducting mode. In the embodiment in FIG. 10, the control circuit 166 configures the boost converter circuit 162 to respectively draw different currents from the electric transformer 120 in a first period T11 and a second period T12 of the period T1. Additionally, the control circuit 166 configures a first current drawn in the first period T11 by the boost converter circuit 162 to be greater than a second current drawn in the second period T12 by the boost converter circuit 162.

In the aforementioned embodiments, the control circuit 166 may configure the frequency, the duty cycle, the conducting time, and the off time of the first control signal SW1 to be the suitable value(s) in different time period. Therefore, a maximum value and a minimum value of the current Iet may be respectively maintained at the required value within the required time period. For example, the control circuit 166 may configure the first control signal SW1 in two or more time periods. Moreover, in the aforementioned embodiments, the control circuit 166 may also configure the frequency, the duty cycle, the conducting time, and the off time of the first control signal SW1 in a continuous manner so that the maximum value and the minimum value of the current Iet may be continuously changed.

Figure 10:
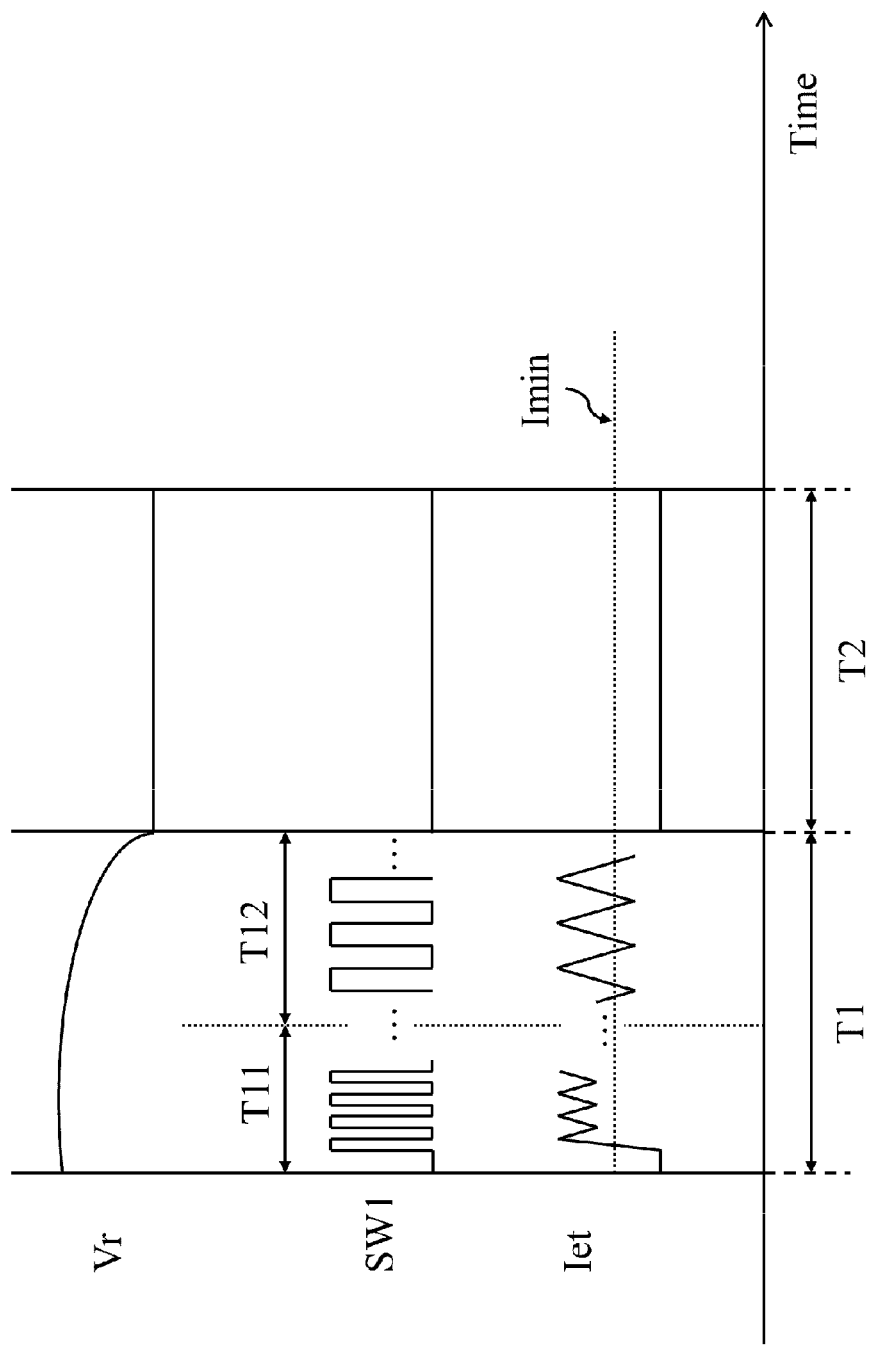
FIG. 10 shows a simplified timing diagram of several signals generated by the illumination system in FIG. 1 according to another embodiment of the present disclosure.

In the embodiment in FIG. 10, the dimmer control circuit 430 may configure the first reference voltage generating circuit 411 so that the first comparator circuit 413 generates the suitable first control signal SW1 to configure the first switch 315. Therefore, the boost converter circuit 162 may draw different currents from the electric transformer 120.

For example, the dimmer control circuit 430 may configure the first reference voltage generating circuit 411 to configure a signal value of the first reference voltage signal Vref1. Therefore, the current drawn from the electric transformer 120 by the boost converter circuit 162 in the first period T11 according to the first control signal SW1 is greater than the current drawn from the electric transformer 120 by the boost converter circuit 162 in the second period T12 according to the first control signal SW1.

For example, in one embodiment, the control circuit 166 configures a minimum value of the current Iet drawn from the electric transformer 120 by the boost converter circuit 162 in the first period T11 to be greater than a minimum value of the current Iet drawn from the electric transformer 120 by the boost converter circuit 162 in the second period T12.

In other embodiments, the control circuit 166 configures a maximum value of the current Iet drawn from the electric transformer 120 by the boost converter circuit 162 in the first period T11 to be greater than a maximum value of the current Iet drawn from the electric transformer 120 by the boost converter circuit 162 in the second period T12.

In other embodiments, the control circuit 166 may also configure the frequency, the duty cycle, the conducting time, and the off time of the first control signal SW1. Therefore, the current Iet drawn from the electric transformer 120 by the boost converter circuit 162 in the first period T11 is greater than the current Iet drawn from the electric transformer 120 by the boost converter circuit 162 in the second period T12.

In the embodiment in FIG. 10, the boost converter circuit 162 has drawn enough current from the electric transformer 120 in the first period T11 for the normal operation of the electric transformer 120. Accordingly, the minimum value of the current Iet drawn from the electric transformer 120 by the boost converter circuit 162 in the second period T12 may be configured to be less than the minimum load current Imin of the electric transformer 120. In this situation, the electric transformer 120 may not only operate normally, but also reduce the limitation of hardware design and conserve energy.

In other embodiments, the control circuit 166 may configure the minimum value of the current Iet drawn from the electric transformer 120 by the boost converter circuit 162 in the first period T11 to be less than the minimum load current Imin of the electric transformer 120.

In the aforementioned embodiments, each functional block may be realized with one or more suitable circuit structures, and is not limited to the aforementioned embodiments. For example, the boost converter circuit 162 may be realized with a boost circuit, a buck-boost circuit, a charge pump circuit, etc. The buck converter circuit 164 may be realized with a buck circuit, a buck-boost circuit, etc. The control circuit 166 may be realized with a logic circuit, a microprocessor, a microcontroller, etc.

In the aforementioned embodiments, each functional block may be realized with one or more circuit components, or multiple functional blocks may be integrated in one circuit component appropriately. For example, the rectifier circuit 140, the power converter circuit 160, and the low power illumination device 190 in FIG. 1 may be arranged together in a bulb or a tube, and may be connected with other circuit components through appropriate terminals (not shown in FIG. 1).

In the aforementioned embodiments, the power converter circuit 160 is realized with only a boost converter circuit 162 and a buck converter circuit 164. In other embodiments, the power converter circuit 160 may be realized with one or more boost converter circuits, one or more buck converter circuits, and/or one or more buck-boost converter circuits. Therefore, the voltage outputted to the low power illumination device 190 may be configured to be greater than the minimum load voltage of the low power illumination device 190.

In the aforementioned embodiments, the signal and relative functional blocks are explained in the active high manner for the purposes of conciseness and clear explanation. In other embodiments, each functional block and each signal may be respectively realized with active high method or active low method according to different design considerations.

In the aforementioned embodiments, the power converter circuit of the illumination system may operate in two or more operating modes. In the current conducting mode, the boost converter circuit of the power converter circuit may draw enough current from the electric transformer so that the electric transformer may operate normally. In the off mode, the boost converter circuit of the power converter circuit may stop drawing current from the electric transformer to conserve energy. Moreover, the buck converter circuit of the power converter circuit may steadily supply power to the low power illumination device according to the boost voltage signal of the boost converter circuit. Therefore, the low power illumination device may steadily provide the illuminating function.

Moreover, the control circuit of the power converter circuit may configure the buck converter circuit to output the required voltage and/or current to the low power illumination device according to the configuration of the dimmer. Therefore, the low power illumination device may generate the required brightness and provide the required dimming function.

The control circuit of the power converter circuit may configure the boost converter circuit to draw current in multiple operation modes. Accordingly, the low power illumination device may operate even better when cooperating with circuit components such as the dimmer and the electric transformer, and the compatibility problem may be solved.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A power converter circuit of an illumination system, for coupling with an electric transformer through a rectifier circuit; wherein the electric transformer generates a conversion voltage signal according to a phase-cut signal provided by a dimmer, the rectifier circuit generates a rectified voltage signal according to the conversion voltage signal, and the power converter circuit supplies power to a low power illumination device according to the rectified voltage signal; comprising:

a boost converter circuit, coupled with the rectifier circuit, configured to operably generate a boost voltage signal according to the rectified voltage signal;

a buck converter circuit, coupled with the boost converter circuit, configured to operably generate a buck voltage signal for supplying power to the low power illumination device according to the boost voltage signal; and a control circuit, coupled with the boost converter circuit and the buck converter circuit, configured to operably configure the boost converter circuit to operate in a current conducting mode to draw current from the electric transformer when the rectified voltage signal is greater than a predetermined voltage signal, and to operably configure the boost converter circuit to operate in an off mode to stop drawing current from the electric transformer when the rectified voltage signal is less than the predetermined voltage signal;

wherein a signal value of the boost voltage signal is greater than a signal value of the rectified voltage signal; a signal value of the buck output signal is less than the signal value of the boost voltage signal; the control circuit generates a computation value according to the rectified voltage signal, when the computation value equals to a first value, the control circuit configures the buck converter circuit to configure the buck voltage signal to be a first voltage value, and when the computation value equals to a second value, the control circuit configures the buck converter circuit to configure the buck voltage signal to be a second voltage value.

2. The power converter circuit of claim 1, wherein when the computation value respectively equals to the first value, the second value and a third value, the control circuit configures the buck converter circuit to respectively provide a first current value, a second current value and a third current value to the low power illumination device.

3. The power converter circuit of claim 2, wherein when a difference between the first value and the second value equals to a difference between the second value and the third value, the control circuit configures a difference between the first current value and the second current value to be equal to a difference between the second current value and the third current value.

4. The power converter circuit of claim 2, wherein when a difference between the first value and the second value equals to a difference between the second value and the third value, the control circuit configures a difference between the first current value and the second current value to be greater than a difference between the second current value and the third current value.

5. The power converter circuit of claim 2, wherein when a difference between the first value and the second value is equal to a difference between the second value and the third value, the control circuit configures a difference between the first current value and the second current value to be less than a difference between the second current value and the third current value.

6. The power converter circuit of claim 1, wherein the control circuit configures the boost converter circuit to draw a first current in a first period in the current conducting mode before drawing a second current in a second period in the current conducting mode, and the first current drawn in the first period is greater than the second current drawn in the second period.

7. The power converter circuit of claim 6, wherein a minimum value of the first current drawn in the first period is greater than a minimum value of the second current drawn in the second period.

8. The power converter circuit of claim 6, wherein a maximum value of the first current drawn in the first period is greater than a maximum value of the second current drawn in the second period.

9. The power converter circuit of claim 6, wherein a minimum value of the second current drawn in the second period is less than a minimum load current value of the electric transformer.

10. A control circuit of a power converter circuit of an illumination system; wherein the illumination system comprises a dimmer, an electric transformer, a rectifier circuit, a boost converter circuit, and a buck converter circuit; the dimmer generates a phase-cut signal according to an input voltage signal; the electric transformer is coupled with the dimmer for generating a conversion voltage signal according to the phase-cut signal; the rectifier circuit is coupled with the electric transformer for generating a rectified voltage signal according to the conversion voltage signal; the boost converter circuit is coupled with the rectifier circuit for generating a boost voltage signal according to the rectified voltage signal; the buck converter circuit is coupled with the boost converter circuit for generating a buck voltage signal according to the boost voltage signal so as to supply power to a low power illumination device; and the control circuit is configured to operably coupled with the boost converter circuit and the buck converter circuit; comprising:

- a boost control circuit, configured to operably configure a conducting status of a first switch of the boost control circuit;
- a buck control circuit, configured to operably configure a conducting status of a second switch of the buck control circuit; and
- a dimmer control circuit, coupled with the boost control circuit and the buck control circuit, configured to operably configure the boost control circuit to intermittently conduct the first switch so that the boost converter circuit operates in a current conducting mode to draw current from the electric transformer when the rectified voltage signal is greater than a predetermined voltage signal, and to operably configure the boost control circuit to turn off the first switch so that the boost converter circuit operates in an off mode to stop drawing current from the electric transformer when the rectified voltage signal is less than the predetermined voltage signal;
- wherein a signal value of the boost voltage signal is greater than a signal value of the rectified voltage signal; a signal value of the buck output signal is less than the signal value of the boost voltage signal; the dimmer control circuit generates a computation value according to the rectified voltage signal; when the computation value equals to a first value, the dimmer control circuit configures the buck control circuit to configure the conducting status of the second switch so that the buck converter circuit configures the buck voltage signal to be a first voltage value; and when the computation value equals to a second value, the dimmer control circuit configures the buck control circuit to configure the conducting status of the second switch so that the buck converter circuit configures the buck voltage signal to be a second voltage value.

11. The control circuit of claim 10, wherein when the computation value respectively equals to the first value, the second value and a third value, the dimmer control circuit configures the buck control circuit to configure the conducting status of the second switch so that the buck converter circuit respectively provides a first current value, a second current value and a third current value to the low power illumination device.

12. The control circuit of claim 11, wherein when a difference between the first value and the second value is equal to a difference between the second value and the third value, the dimmer control circuit configures a difference between the first current value and the second current value to be equal to a difference between the second current value and the third current value.

13. The control circuit of claim 11, wherein when a difference between the first value and the second value is equal to a difference between the second value and the third value, the dimmer control circuit configures a difference between the first current value and the second current value to be greater than a difference between the second current value and the third current value.

14. The control circuit of claim 11, wherein when a difference between the first value and the second value is equal to a difference between the second value and the third value, the dimmer control circuit configures a difference between the first current value and the second current value to be less than a difference between the second current value and the third current value.

15. The control circuit of claim 10, wherein the dimmer control circuit configures the boost control circuit to intermittently conduct the first switch so that the boost converter circuit draws a first current in a first period in the current conducting mode before drawing a second current in a second period in the current conducting mode, and the first current drawn in the first period is greater than the second current drawn in the second period.

16. The control circuit of claim 15, wherein a minimum value of the first current drawn in the first period is greater than a minimum value of the second current drawn in the second period.

17. The control circuit of claim 15, wherein a maximum value of the first current drawn in the first period is greater than a maximum value of the second current drawn in the second period.

18. The control circuit of claim 15, wherein a minimum value of the second current drawn in the second period is less than a minimum load current value of the electric transformer.

19. The control circuit of claim 10, further comprising:
- a first reference voltage generating circuit, configured to operably generate a first reference voltage signal;
- a first comparator circuit, configured to operably generate a first control signal according to a first sensing signal of the boost converter circuit and the first reference voltage signal so as to control the conducting status of the first switch;
- a second reference voltage generating circuit, configured to operably generate a second reference voltage signal; and
- a second comparator circuit, configured to operably generate a second control signal according to a second sensing signal of the buck converter circuit and the second reference voltage signal so as to control the conducting status of the second switch;
- wherein the dimmer control circuit configures the second reference voltage generating circuit to configure the second reference voltage signal according to the computation value so as to configure the conducting status of the second switch.

20. A control method of a power converter circuit of an illumination system; wherein the illumination system comprises a dimmer, an electric transformer, a rectifier circuit, a boost converter circuit, and a buck converter circuit; the dimmer generates a phase-cut signal according to an input voltage signal; the electric transformer is coupled with the dimmer for generating a conversion voltage signal according to the phase-cut signal; the rectifier circuit is coupled with the electric transformer for generating a rectified voltage signal according to the conversion voltage signal; the boost converter circuit is coupled with the rectifier circuit for generating a boost voltage signal according to the rectified voltage signal; and the buck converter circuit is coupled with the boost converter circuit for generating a buck voltage signal according to the boost voltage signal so as to supply power to a low power illumination device; comprising:

configuring a first switch of the boost converter circuit to be turned off when the rectified voltage signal is less than a predetermined voltage signal so that the boost converter circuit operates in an off mode to stop drawing current from the electric transformer;

configuring the first switch of the boost control circuit to be intermittently conducted when the rectified voltage signal is greater than the predetermined voltage signal so that the boost converter circuit operates in a current conducting mode to draw current from the electric transformer;

generating a computation value according to the rectified voltage signal;

when the computation value equals to a first value, configuring a conducting status of a second switch of the buck control circuit so that the buck converter circuit configures the buck voltage signal to be a first voltage value; and when the computation value equals to a second value, configuring the conducting status of the second switch of the buck control circuit so that the buck converter circuit configures the buck voltage signal to be a second voltage value;

wherein a signal value of the boost voltage signal is greater than a signal value of the rectified voltage signal, and a signal value of the buck output signal is less than the signal value of the boost voltage signal.

* * * * *